United States Patent

Tanaka et al.

[11] Patent Number: 5,154,261
[45] Date of Patent: Oct. 13, 1992

[54] ELECTROMAGNETIC DISC BRAKE FOR ELEVATOR LIFTING APPARATUS

[75] Inventors: Masakatsu Tanaka; Masanobu Itoh; Toshihiko Nara, all of Katsuta; Tasuhiko Takahashi, Ibaraki, all of Japan

[73] Assignee: Hitachi, Ltd., Tokyo, Japan

[21] Appl. No.: 557,802

[22] Filed: Jul. 26, 1990

[30] Foreign Application Priority Data

Aug. 18, 1989 [JP] Japan .................. 1-211350

[51] Int. Cl.⁵ .................................... B60T 13/74
[52] U.S. Cl. .................. 188/171; 188/72.1; 188/72.3; 188/161; 188/216
[58] Field of Search .......... 188/171, 174, 72.3, 188/72.1, 161, 163, 158, 216; 192/90, 84 C; 310/77; 187/108

[56] References Cited

U.S. PATENT DOCUMENTS

| | | |
|---|---|---|
| 2,663,387 | 12/1953 | Berkovitz ............. 188/171 |
| 2,949,172 | 8/1960 | Simons ................ 188/171 |
| 3,202,244 | 8/1965 | Vogelsang et al. ..... 188/171 |
| 3,357,528 | 12/1967 | Verlinde .............. 188/171 |
| 3,983,971 | 10/1976 | Kawai ................. 188/171 |
| 4,142,610 | 3/1979 | Alexander et al. ..... 188/171 X |
| 4,156,478 | 5/1979 | Kroeger .............. 188/171 |
| 4,187,603 | 2/1980 | Kroeger . | |
| 4,285,420 | 8/1981 | Sekella . | |
| 4,445,596 | 5/1984 | Waters et al. ........ 188/171 |
| 4,566,575 | 1/1986 | Sekella . | |
| 4,582,187 | 4/1986 | Sekella . | |
| 4,982,825 | 1/1991 | Sekella .............. 188/161 X |

FOREIGN PATENT DOCUMENTS

| | | |
|---|---|---|
| 2840565 | 3/1980 | Fed. Rep. of Germany ...... 188/171 |
| 168327 | 7/1979 | Japan . |
| 63-173530 | 11/1988 | Japan . |
| 1587700 | 4/1981 | United Kingdom . |
| 2198198 | 6/1988 | United Kingdom . |

OTHER PUBLICATIONS

"Modern Mobile Engine" published by Chung Hwa Bookstore, pp. 2–218. (undated).

Primary Examiner—Douglas C. Butler
Attorney, Agent, or Firm—Antonelli, Terry, Stout & Kraus

[57] ABSTRACT

An electromagnetic disc brake for an elevator lifting apparatus comprises a disc spline-coupled with a rotational shaft. Braking body and an armature disposed to clamp the disc; braking springs press the armature against the disc, and an iron core is provided which includes inner and outer magnetic poles each facing the armature and concentrically formed with respect to the rotational shaft. An electromagnetic coil generates magnetic flux to pass through the inner and outer magnetic poles as magnetic paths. In addition, at least one of the pole face of the outer magnetic pole and the facing portion of the armature where it faces the pole face is provided with an arrangement for increasing a magnetic gap, and the braking springs are disposed in portions of the outer magnetic pole. Further, the braking body is supported through a sound absorbing member or one side of the armature facing the disc is formed of a sound absorbing member.

14 Claims, 8 Drawing Sheets

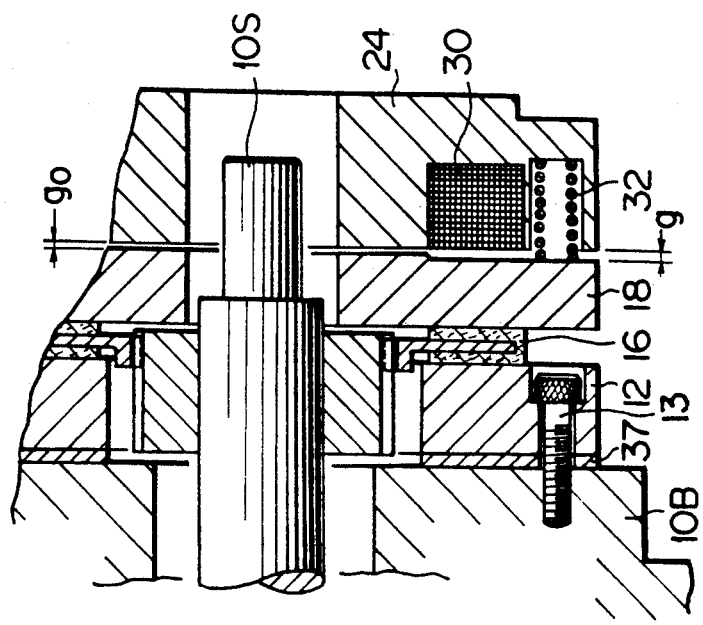
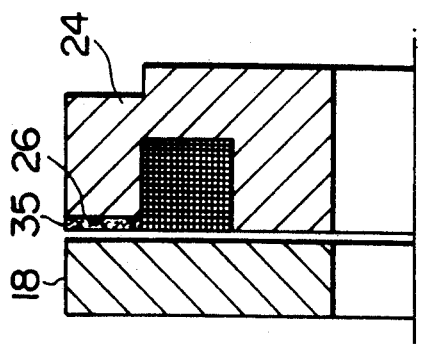
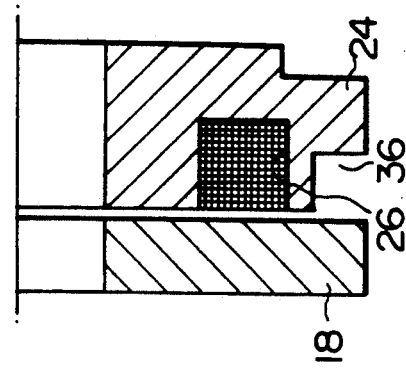
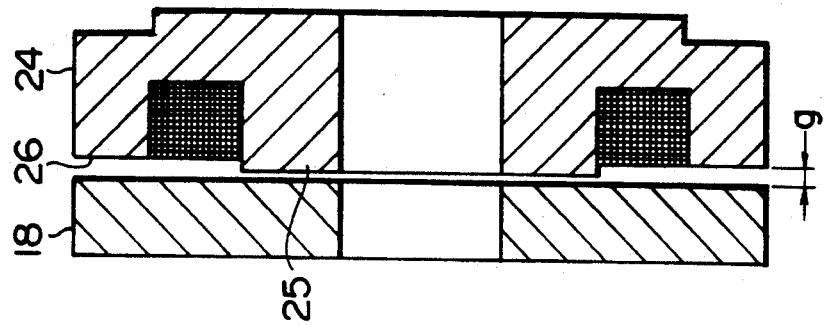

ELECTROMAGNETIC DISC BRAKE FOR ELEVATOR LIFTING APPARATUS

BACKGROUND OF THE INVENTION

The present invention relates to an electromagnetic disc brake for an elevator lifting apparatus.

A conventional electromagnetic disc brake is disclosed in, for example, Japanese Utility Model Unexamined Publication No. 63-173530 is arranged so as to eliminate an unfavorable effect caused by residual magnetism on an armature.

The above-mentioned conventional electromagnetic disc brake has an operational characteristic so as to induce idle running of a cage due to an insufficient release speed (return speed) of the armature at the time of the operation of the brake.

SUMMARY OF THE INVENTION

One object of the present invention is to provide an electromagnetic disc brake for an elevator lifting apparatus which has improved operational characteristics.

Another object of the present invention is to provide an electromagnetic disc brake for an elevator lifting apparatus which can diminish the noise during the operation.

In order to achieve the above-described objects, an electromagnetic disc brake for an elevator lifting apparatus of the invention comprises a disc spline-coupled with a rotational shaft, a braking body and an armature disposed to clamp the disc. Braking springs press the armature against the disc, and an iron core is provided which includes inner and outer magnetic poles each facing the armature and concentrically formed with respect to the rotational shaft. An electromagnetic coil generates magnetic flux to pass through the inner and outer magnetic poles as magnetic paths, with at least one of the pole face of the outer magnetic pole and the facing portion of the armature where it faces this pole face being provided with means for increasing a magnetic gap. The the braking springs are disposed in portions of the outer magnetic pole, and the braking body is supported through a sound absorbing member or one side of the armature facing the disc is formed of a sound absorbing member.

By virtue of provisions of the means for increasing the magnetic gap provided on the side of the outer magnetic pole, attraction force of the outer magnetic pole which has the larger attraction area is decreased, and also, the braking springs disposed on the outer magnetic pole side contribute to smooth and swift release of the aarmature from the iron core when an area of the armature where there is less attraction force is pressed by the force of the braking springs. Besides, the noise caused by the attraction and release of the armature to and from the iron core is absorbed by the sound absorbing member, whereby the noise can be diminished.

Thus, according to the present invention, the operational characteristic can be improved by reducing the time to start the braking operation, and the noise during the operation can also be diminished.

BRIEF DESCRIPTION OF THE DRAWINGS

FIGS. 11, 12 and 13, are vertical sectional views respectively showing configurations of the iron core of the electromagnetic disc brake according to the present invention; and FIGS. 14, 15 and 16 are vertical sectional views showing the main portion of the electromagnetic disc brake respectively provided with noise absorbing members according to the present invention.

DETAILED DESCRIPTION OF THE PREFERRED EMBODIMENTS

One embodiment of an electromagnetic disc brake according to the present invention will be described hereinafter with reference to the attached drawings.

Figure 6:
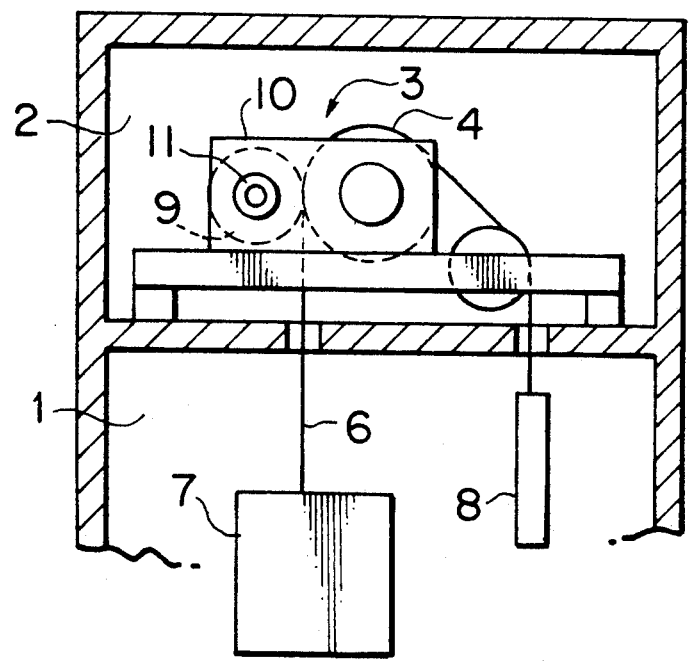
FIG. 6 is an explanatory view showing an operating state of the electromagnetic disc brake for the elevator lifting apparatus according to the present invention.
Figure 7:
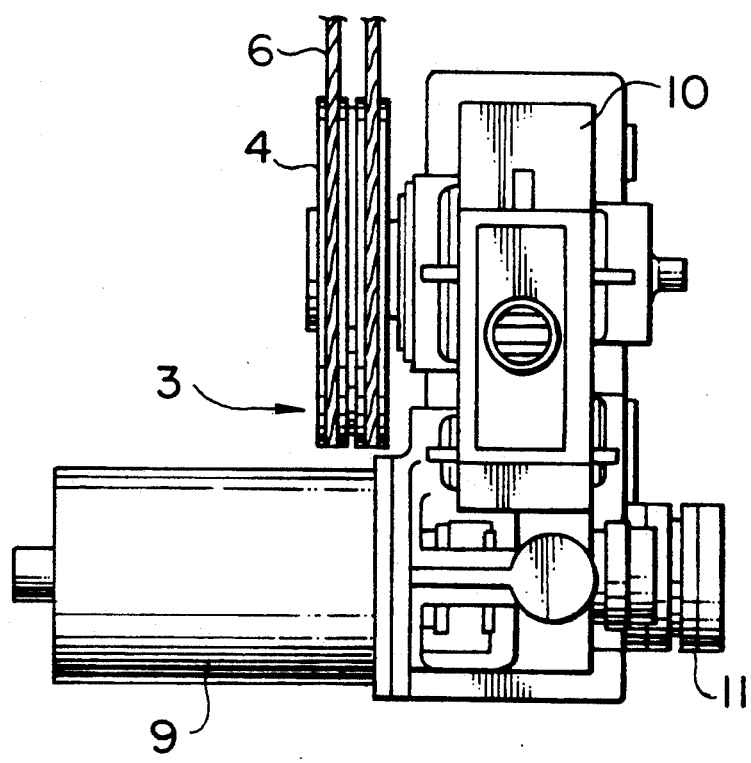
FIG. 7 is a plan view showing an operating state of the electromagnetic disc brake when applied to the elevator lifting apparatus.

As shown in FIG. 6, an elevator is provided with a lifting apparatus 3 in a machine room 2 which is mounted on a top of an elevator passage 1. The lifting apparatus 3, as shown in FIG. 7, includes a sheave 4 around which a wire rope 6 is wound for suspending a cage 7 and a balancing weight 8, an electric motor 9 which drives the sheave 4, and a parallel axis reduction gear arrangement 10 connected between the electric motor 9 and the sheave 4. An electromagnetic disc brake 11 according to the present invention is attached to an input shaft of the reduction gear arrangement 10.

Figure 1:
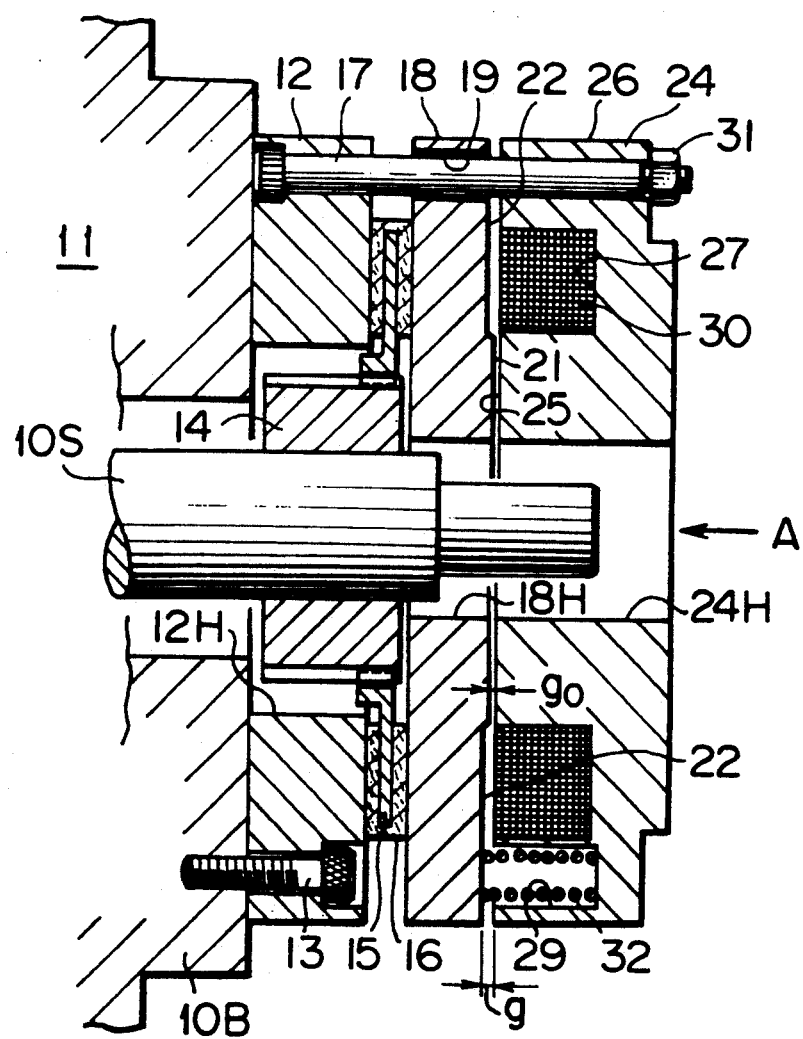
FIG. 1 is a vertical sectional view showing one embodiment of an electromagnetic disc brake for an elevator lifting apparatus according to the present invention.
Figure 2:
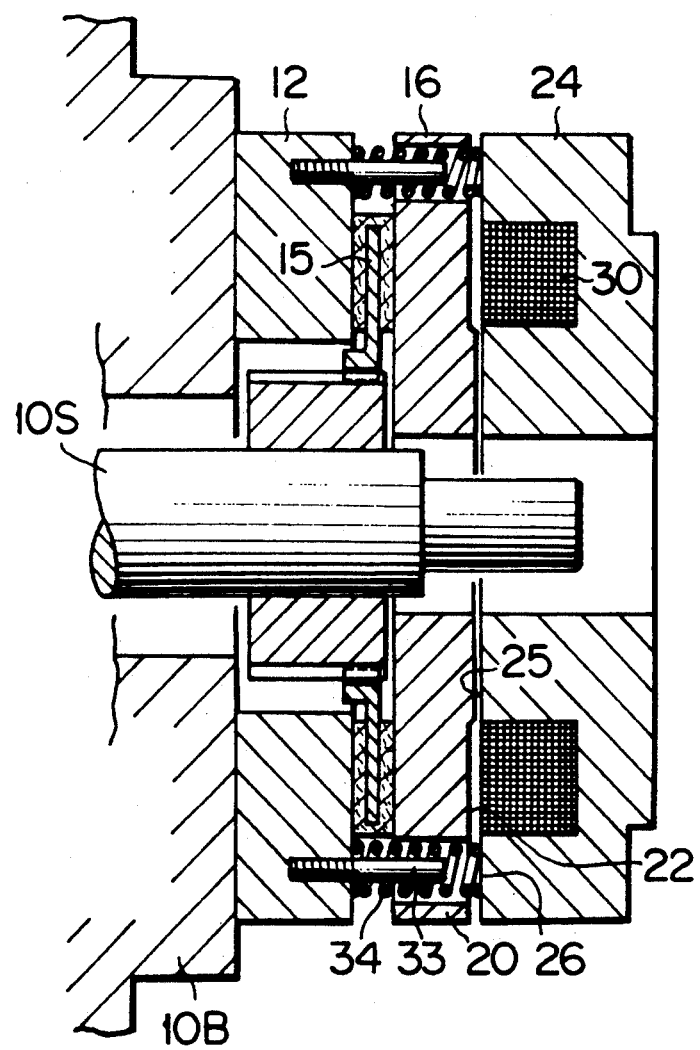
FIG. 2 is a vertical sectional view showing the embodiment of FIG. 1 taken along a different line.

Referring to FIGS. 1 and 2, the input shaft 10S of the reduction gear arrangement protrudes 10 through the outer wall of a reduction gear box 10B, and a braking body 12, defining a through hole 12H in the center and concentrically formed with the input shaft 10S, is secured to the reduction gear box 10B by bolts 13. A spline boss 14, splined on its outer periphery, is fitted around the input shaft 10S within the through hole 12H of the braking body 12. A disc 15 is spline-coupled with the spline boss 14, so as to move only in the axial direction. On both sides of an outer peripheral portion of the disc 15 is attached a lining 16, one side of which faces one end surface of the braking body 12. The braking body 12 is provided with a plurality of guide pins 17 on its outer periphery which extend along the axial direction, with the guide pins 17 serving to guide an armature 18 so that the armature is adapted to move in the axial direction and to face the other side of the lining 16.

Figure 4:
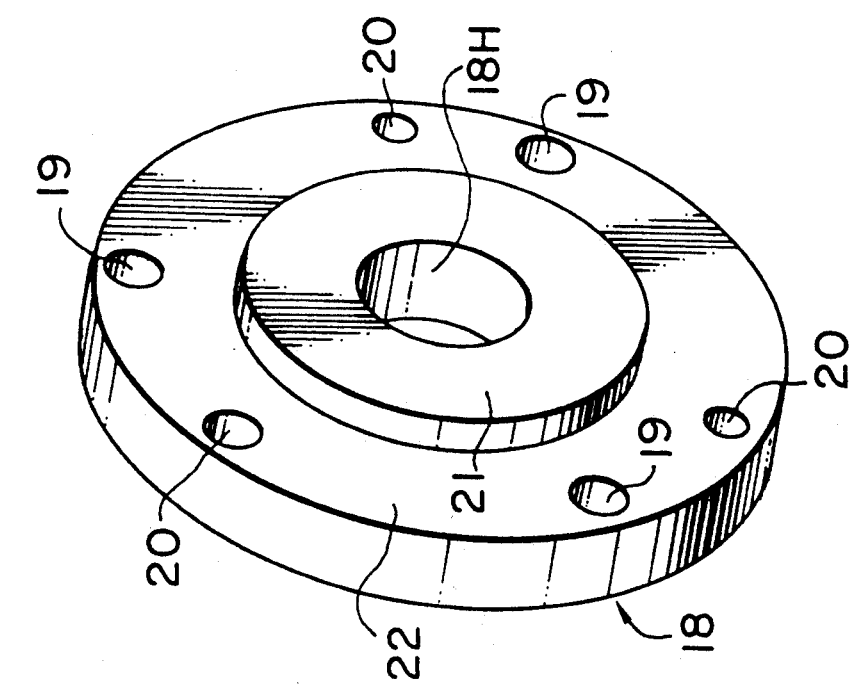
FIG. 4 is a perspective view showing an armature of the above embodiment.

Referring to FIG. 4, the armature 18 has a disc type configuration with a through hole 18H in the center thereof through which the input shaft 10S extends. Further, referring to FIGS. 1 and 2, through the armature 18 on its outer peripheral portion are bored guide holes 19 for extending the guide pins 17 and spring holes 20 for extending biasing springs 34. Also, the other side of the armature 18, not facing the lining 16, is formed with a magnetic pole facing surface 21 opposed to an inner magnetic pole 25 of an iron core 24 and with a recessed surface 22 which is at a slightly larger distance from the iron core 24 than the magnetic pole facing surface 21 (see FIG. 4). That is, on the location facing the magnetic pole facing surface 21 and the recessed surface 22 of the armature 18 is disposed the iron core 24 which includes the inner magnetic pole 25 and an outer magnetic pole 26 annularly formed to be concentrical with the input shaft 10S. The inner magnetic pole 25 and the outer magnetic pole 26 are integrally connected at the other side not facing the armature 18. An annular coil 30 is incorporated within an annular groove 27 which is defined by the inner magnetic pole 25 and the outer magnetic pole 26.

Figure 3:
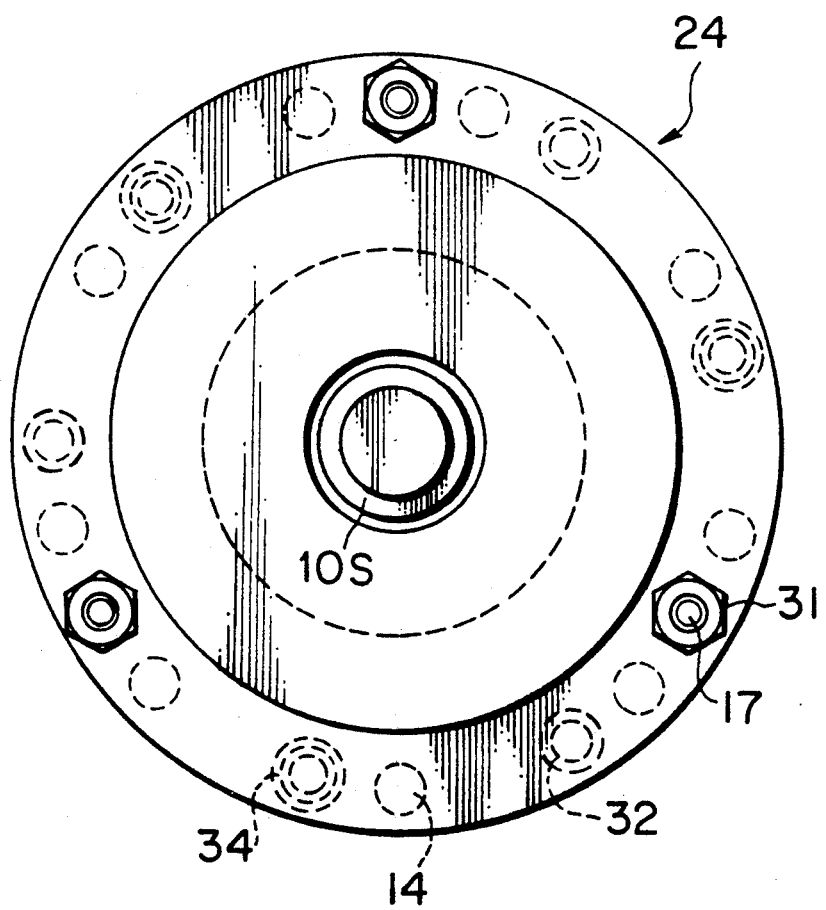
FIG. 3 is a side view of the same embodiment.
Figure 5:
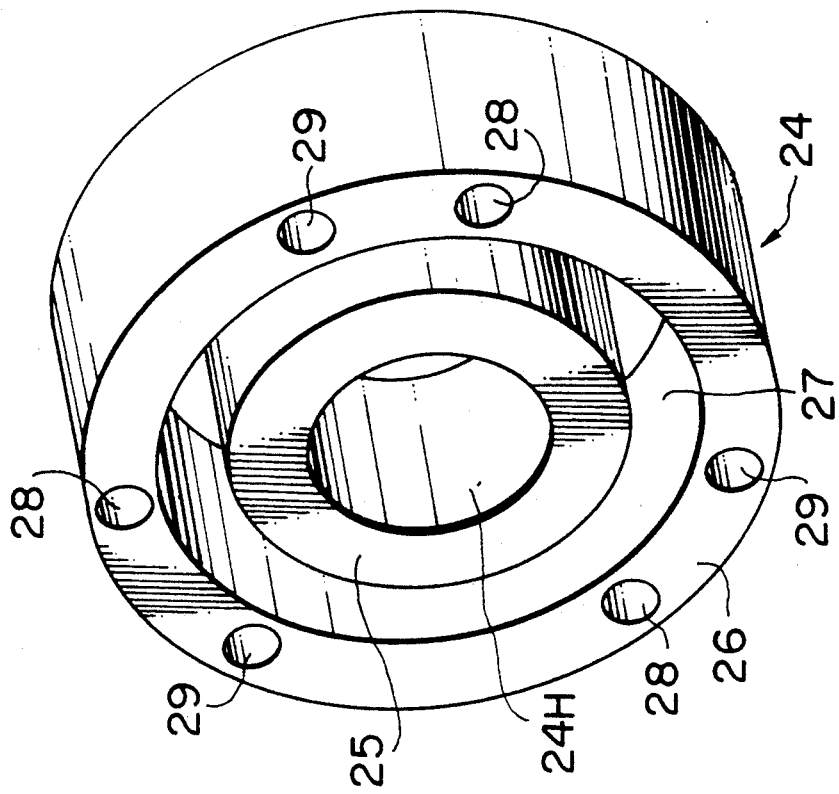
FIG. 5 is a perspective view showing an iron core of the same embodiment.

As shown in FIG. 5, a through hole 24H, through which the input shaft 10S extends, is provided in the center of the iron core 24, and in the vicinity of its outer peripheral end portion are provided with pin holes 28 for extending the guide pins 17 and spring receiving holes 29 for receiving braking springs 32. Referring to FIG. 3, the iron core 24 is securely fixed by extending the guide pins 17 through the pin holes 28, and threading nuts 31 onto the tips of the guide pins 17 extending out of the holes 28. Referring to FIG. 1, each braking spring 32, formed as a compression spring, abuts against the bottom portion of the spring receiving hole 29 at its one end and also abuts against the outer peripheral portion of the recessed surface 22 of the armature 18 at the other end, causing the armature 18 to be pressed onto the lining 16. On the other hand, referring to FIG. 2, each biasing spring 34 within the spring hole 20 of the outer peripheral portion of the armature 18, also formed as a compression spring, abuts against the outer magnetic pole 26 of the iron core 24 at its one end and abuts against the braking body 12 at the other end so that the iron core 24 is pressed to be away from. the braking body 12. Guide pins 33 are provided for guiding the respective biasing spring 34.

In the electromagnetic disc brake 11 according to the present invention, the armature 18 is usually pressed against the braking body 12 by the pressing force of the braking springs 32. Thus, the disc 15 is held and pressed between the braking body 12 and the armature 18 through the lining 16. Consequently, the input shaft 10S, spline-coupled with the disc 15, will be stopped from rotating and, in this state, the cage 7 is stopped. Then, the inner magnetic pole 25 of the iron core 24 is separated from the magnetic pole facing surface 21 of the armature 18 with a slight gap, namely the distance $g_0$, and the outer magnetic pole 26 is separated from the recessed surface 22 with a gap larger than the distance $g_0$, namely, the distance g. The distance $g_0$ is adjusted by threading the nuts 31 on the ends of the guide pins 17, that is, the distance $g_0$ will become even smaller if the nuts 31 are threaded against the pressing direction of the biasing springs 34, and on the contrary, the slight distance $g_0$ will become larger if the nuts 31 are loosened along the pressing direction of the biasing springs 34.

On the other hand, when the cage 7 is to be raised or lowered by energizing the coil 30, the armature 18 is attracted toward the iron core 24, and the magnetic pole facing surface 21 of the armature 18 is brought into frictional contact with the inner magnetic pole 25, reducing the distance $g_0$ to zero. As a result, a gap with the same distance as the moving distance of this armature 10 is formed between the armature 18 and the lining 16, which makes the rotation of the disc 15 possible.

Accordingly, referring to FIG. 6, the input shaft 10S, driven by the electric motor 9, rotates the sheave 4 so that the cage 7 is raised or lowered.

According to the above-described embodiment, by virtue of the recessed surface 22 provided on the armature 18 so as to face the outer magnetic pole 26, the effect of residual magnetism of the outer magnetic pole 26 onto the recessed surface 22 is reduced when the coil 30 is deenergized, and the residual magnetism on the inner magnetic pole 25 which has been closely fitted to the armature 18 only takes effect. Also, due to the braking springs 32 disposed on the outer peripheral portion which is less affected by the residual magnetism, the armature 18 is easily detached from the iron core 24 by pushing the iron core 24 at a point away from the closely fitted portion, resulting in the swift movement of the armature 18 toward the lining 16 so as to brake the disc 15. Therefore, the time can be reduced for the armature 18 to actually start moving to brake the disc 15 after the command of the deenergization of the coil 30. This is explained with reference to the graphical illustrations of wherein FIGS. 8 through 10 $S_1$ shows a case where the distance between the outer and inner magnetic poles of the iron core and the armature is fixed, $S_2$ shows the case according to the above-described embodiment where the distance between the outer magnetic pole and the armature is larger than the distance between the inner magnetic pole and the armature, $S_3$ is a case where the relationship between the iron core and the armature is the same as the case $S_1$ while the electromagnetic attractive force itself is determined lower, and $S_4$ is a case where the distance between the inner magnetic pole and the armature is larger than the distance between the outer magnetic pole and the armature, the remaining parts of the construction being common in all the cases.

Figure 8:
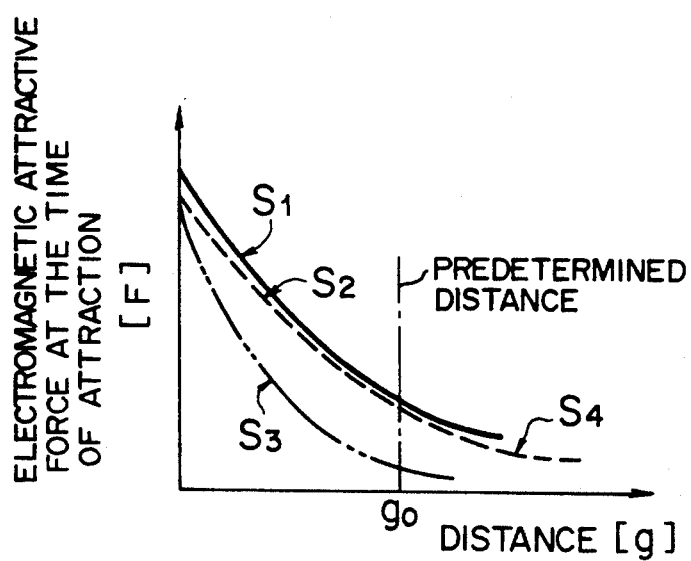
FIGS. 8, 9 and 10 are graphical illustrations respectively showing the characteristics of the electromagnetic disc brake according to the present invention.
Figure 9:
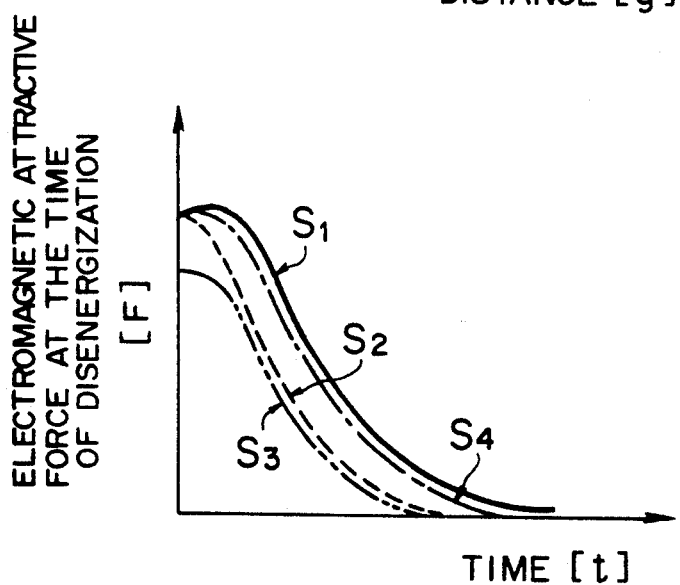
Figure 10:
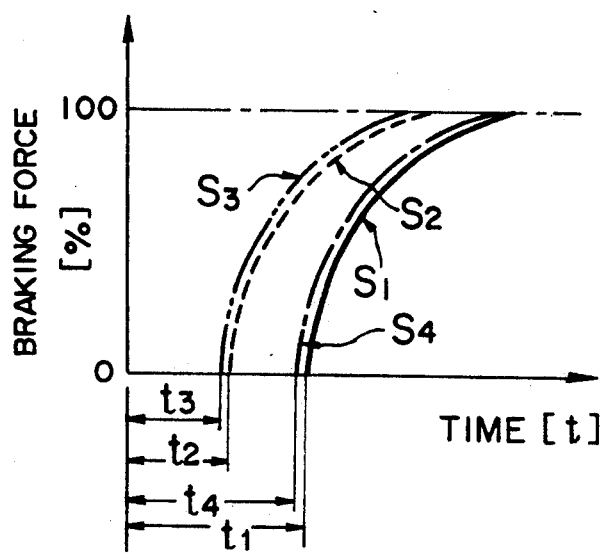

First, referring to FIG. 8, the electromagnetic attractive force at the predetermined distance $g_0$ deteriorates to some extent as the distance g of the outer magnetic pole becomes larger. However, the attractive force at the time of attraction is substantially the same with regard to any cases except $S_3$ where the electromagnetic attractive force itself is lower. On the other hand, the electromagnetic attractive force at the time of attraction is larger at the outer magnetic pole than at the inner magnetic pole, so that the electromagnetic attractive force at the time of deenergization of the coil will become such as illustrated in FIG. 9. The effect of the electromagnetic attractive force is reduced faster in the cases of $S_2$ and $S_3$ as compared with the cases of $S_1$ and $S_4$ in relation to the effect of the residual magnetism on the contact surfaces of the iron core and the armature and the location of application points of the braking springs. As a result, the time for the brake to start braking will become less in the cases of $S_2$ and $S_3$ as compared with $t_1$ and $t_4$ in the cases of $S_1$ and $S_4$, as shown in FIG. 10. That is, in those cases, the time period from the braking command to the start of braking is reduced, and this will be the best condition as a brake for an elevator lifting apparatus in which safety is the most important factor.

It should be noted that as far as the time used for the start of braking is concerned, there is not any difference between $S_2$ and $S_3$, but that the electromagnetic attractive force of $S_3$ at the time of attraction (brake released time) at the predetermined distance $g_0$ is remarkably weak, as is shown in FIG. 8, so that it cannot be employed because of lack in reliability with regard to the brake release.

Besides, according to the present invention, an impact noise, which is caused by metallic members such as the iron core 24 and the armature 18 when the electromagnetic coil 30 is energized to attract the armature 18 to itself, is heard only on the inner magnetic pole 25. In addition, when the impact noise is transmitted in the air through the braking device to the outside, the noise is diminished while traveling through the gaps of the above-described distances ($g_O$ through g), incidentally contributing to diminishing the operation noise of the braking device at the time of attraction. Experiments show that the effect is obtained to an extent of 3 to 5 dB (A).

According to the above-described embodiment, the recessed surface 22 is formed on the armature 18 in the portion facing the outer magnetic pole 26 in order to have a larger distance g. It is also preferable to provide something of the same function as the recessed surface 22 on the outer magnetic pole 26 of the iron core 24. FIGS. 11 through 13 show examples in each of which the iron core 24 is treated, while the armature 18 has a plane surface facing the iron core 24. Referring to FIG. 11, the outer magnetic pole 26 is less protruded on the side facing the armature 18 as compared with the inner magnetic pole 25 on the same side, increasing the distance g between the core 24 and the armature 18. FIG. 12 shows that an additional member 35 is attached to the portion where the iron core is less protruded, and as to a material for the additional member 35, rubber and the like can be used for diminishing the impact noise caused by the armature 18 and itself, or lead and the like can be used for magnetic screening. FIG. 13 shows that a large recessed portion 36 is formed on the outer magnetic pole 26 to lessen the magnetic area and saturate it with magnetism for causing magnetic flux leakage, so that the effect of residual magnetic flux will be decreased.

Further, as the time for starting the brake operation after issuing the braking command is reduced, the impact noise of the armature 18 against the lining 16 may cause uncomfortableness since calmness is indispensable for an elevator lifting apparatus. In that case, as shown in FIG. 14, a sound absorbing member 37 can be interposed between the braking body 12 and the reduction gear box 10B, while the remaining parts have an identical construction with the embodiment shown in FIGS. 1 to 7. As for a material for the sound absorbing member 37, a shock absorbing material can be employed, for example, a metallic material such as a damping steel sheet or cast iron. Having the above-described structure, it is possible to diminish the impact noise generated when the coil 30 is deenergized and the armature 18 presses the lining 16 against the braking body 12 by the braking springs 32. This is effected by diminishing the resonance sound caused when the impact transmitted through the braking body 12 affects the reduction gear box 10B, and as a result, the operation noise can be diminished while the electromagnetic disc brake is at work.

It should be noted that the braking body 12 and the sound absorbing member 37 in the above embodiment are made of different materials, but that the braking body 12 and the sound absorbing member 37 can be integrally formed by employing a shock absorbing material such as cast iron.

Next, another embodiment in which the operation noise is diminished will be explained hereinafter with reference to FIG. 15.

In this case, the armature 18 is composed of two layers. That is, the side facing the iron core 24 is furnished with a magnetic pole plate 39 which is made of a material having high magnetic permeability such as carbon steel, and the side contacted with the lining 16 is provided with a braking plate 38 which is made of a material having both excellent abrasion resistance and shock absorptivity such as cast iron. Both of these members are securely fastened by fastener bolts 40. The remaining parts are identical with the embodiments shown in FIG. 11 and in FIGS. 1 to 7. Due to the above construction, the impact noise or release operation noise is diminished, which noise is caused at the time of braking operation of the electromagnetic disc brake when the armature 18 composed of the magnetic pole plate 39 and the braking plate 38 is released from the iron core 24 to press the lining 16 against the braking body 12, and at the same time, by virtue of the high magnetic permeability of the magnetic pole plate 39 which serves as a magnetic path of the coil 30, the capacity of the coil 30 can be reduced.

Figure 15:
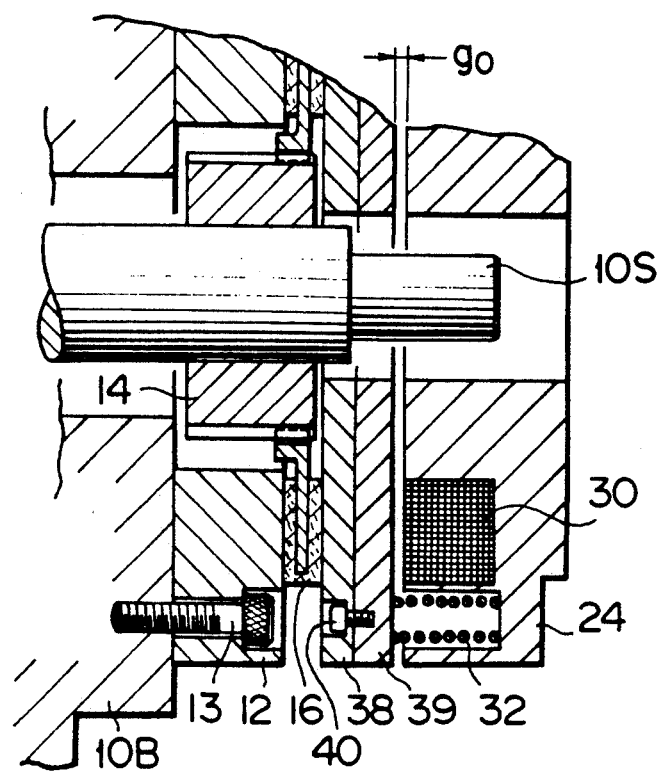
Figure 16:
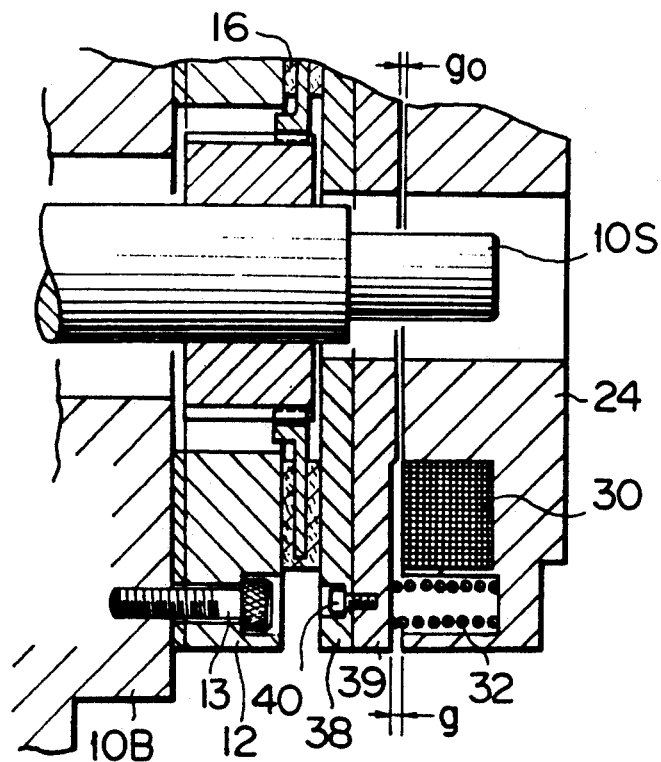

FIG. 16 is one embodiment which is provided with the sound absorbing member 37 shown in FIG. 14 and the armature 18 constructed according to FIG. 15 while the remaining parts are identical with the embodiment shown in FIGS. 1 to 7.

What is claimed is:

1. An electromagnetic disc brake for an elevator lifting apparatus for moving a cage of the elevator lifting apparatus up and down, the electromagnetic disc brake comprising a disc coupled through a spline coupling with a rotational shaft; a braking body; an armature for clamping the disc; braking springs for pressing said armature against said disc; an iron core including an inner magnetic pole and an outer magnetic pole, each of the inner magnetic pole and the outer magnetic pole facing said armature and concentrically formed with respect to said rotational shaft; an electromagnetic coil for generating magnetic flux to pass through said inner magnetic pole and said outer magnetic pole on magnetic paths, and a magnetic gap between said outer magnetic pole and said armature is larger than a magnetic gap between said inner magnetic pole and said armature, wherein said braking springs are disposed in a side of said outer magnetic pole.

2. An electromagnetic disc brake for an elevator lifting apparatus according to claim 1, wherein the outer magnetic pole has a pole face, the magnetic gap between said outer magnetic pole and said armature being provided on the pole face of said outer magnetic pole.

3. An electromagnetic disc brake for an elevator lifting apparatus according to claim 1, wherein the magnetic gap between said outer magnetic pole and said armature are provided on said armature.

4. An electromagnetic disc brake for an elevator lifting apparatus according to claim 1, wherein each of said inner and outer magnetic poles is formed angularly.

5. An electromagnetic disc brake for an elevator lifting apparatus according to claim 1, wherein the magnetic gap between said outer magnetic pole and said armature defines a magnetic saturator means provided on at least one of said outer magnetic pole on said armature.

6. An electromagnetic disc brake for an elevator lifting apparatus according to claim 1, wherein the magnetic gap between said outer magnetic pole and said armature defines a magnetic screening means provided on at least one of said outer magnetic pole or said armature.

7. An electromagnetic disc brake for an elevator lifting apparatus according to claim 1, wherein said braking body includes a sound absorbing member and is held on a stationary member of said elevator lifting apparatus through the sound absorbing member made of metallic material.

8. An electromagnetic disc brake for an elevator lifting apparatus according to claim 7, wherein said sound absorbing member is made of a damping steel sheet.

9. An electromagnetic disc brake for an elevator lifting apparatus according to claim 7, wherein said sound absorbing member is made of cast iron.

10. An electromagnetic disc brake for an elevator lifting apparatus according to claim 1, wherein one side of said armature facing said inner magnetic pole and outer magnetic pole is formed of a magnetic plate, and other side facing said disc is formed of a sound absorbing member made of metallic material.

11. An electromagnetic disc brake for an elevator lifting apparatus according to claim 10, wherein said sound absorbing member is a cast iron plate.

12. An electromagnetic disc brake for an elevator lifting apparatus according to claim 10, wherein said magnetic plate is made of carbon steel.

13. An elevator lifting apparatus comprising a sheave wound with a wire rope for raising and lowering a cage within an elevator passage; an electric motor to drive the sheave; reduction gears interposed between said electric motor and said sheave; an dan electromagnetic disc brake for giving braking force to a rotational shaft of one of said sheave, said electric motor and said reduction gears, said electromagnetic disc brake constituted of a braking body held on a box of said reduction gears; a disc facing the braking body and spline-coupled with said rotational shaft; and armature disposed in a position to clamp the disc with said braking body; an iron core disposed on the other side of said armature from the disc and held against said braking body; a coil incorporated in the iron core; and braking springs retained in outer peripheral portions of said iron core for pressing said armature against said disc, wherein said iron core includes an inner magnetic pole and an outer magnetic pole concentrically formed with respect to said rotational shaft and each having the pole face confronting said armature, so that said coil is incorporated between the inner magnetic pole and the outer magnetic pole of said iron core, and that at least one of the pole face of said outer magnetic pole and a facing portion of said armature where it faces the pole face is provided with means for increasing a magnetic gap.

14. An electromagnetic disc brake for an elevator lifting apparatus comprising a sheave for moving a cage thereof up and down in an elevator passage and having a wire rope, an electric motor for driving said sheave, and a reduction gear connected between said electric motor and said sheave, said electromagnetic disc brake comprising a disc spline-coupled with a rotational shaft of said reduction gear; a braking body; an armature disposed to clamp the disc; an iron core including a inner magnetic pole and an outer magnetic pole concentrically formed with respect to said rotational shaft, each surface of the inner magnetic pole and the outer magnetic poles facing a reverse side of the disc, and being held in said braking body; an electromagnetic coil mounted between said inner magnetic pole and outer magnetic pole of said iron core; braking springs for pressing said armature to a side of said disc, wherein said rotational shaft is an input shaft of said reduction gear, said braking body being held in a reduction gear box; said braking spring being arranged at a outer-diametrical side of the outer magnetic pole, and wherein a magnetic gap between said outer magnetic pole and said armature is larger than a magnetic gap between said inner magnetic pole and said armature.

* * * * *